(12) United States Patent
Yingst et al.

(10) Patent No.: US 6,436,500 B1
(45) Date of Patent: Aug. 20, 2002

(54) PACKAGE RECLOSURE SYSTEM AND METHOD

(75) Inventors: Kenneth Ralph Yingst, Covington; Paul Reid Benson, Pleasant Hill, both of OH (US)

(73) Assignee: 3 Sigma Corporation, Troy, OH (US)

( * ) Notice: Subject to any disclaimer, the term of this patent is extended or adjusted under 35 U.S.C. 154(b) by 146 days.

(21) Appl. No.: 09/698,853

(22) Filed: Oct. 27, 2000

(51) Int. Cl.[7] .............. B32B 3/10; B32B 33/00; B65D 3/16
(52) U.S. Cl. .............. 428/40.1; 53/416; 53/476; 206/807; 206/831; 383/81; 383/200; 383/203; 383/204; 383/210; 428/41.7; 428/41.8; 428/42.1; 428/42.2; 428/42.3; 428/43; 428/121; 493/213; 493/214; 493/927
(58) Field of Search ................ 428/40.1, 41.7, 428/41.8, 42.1, 42.2, 42.3, 43, 121; 383/200, 203, 204, 210, 211, 81; 206/807, 831; 493/213, 214, 927; 53/416, 476

(56) References Cited

U.S. PATENT DOCUMENTS

| | | |
|---|---|---|
| 3,946,507 A | 3/1976 | Ferg et al. |
| 4,008,851 A | 2/1977 | Hirsch |
| 4,402,453 A | 9/1983 | Regenstein, Jr. |
| 4,479,838 A | 10/1984 | Dunsirn et al. |
| 4,526,405 A | 7/1985 | Hattemer |
| 4,543,139 A | 9/1985 | Freedman et al. |
| 4,584,201 A | 4/1986 | Boston |
| 4,622,799 A | 11/1986 | Boston |
| 4,679,693 A | 7/1987 | Forman |
| 4,840,270 A | 6/1989 | Caputo et al. |
| 4,902,141 A | 2/1990 | Linnewiel |
| 4,911,563 A | 3/1990 | Ciani |
| 4,966,780 A | 10/1990 | Hargraves et al. |
| 4,982,845 A | 1/1991 | Prascak et al. |
| 5,029,712 A | 7/1991 | O'Brien et al. |
| 5,035,518 A | 7/1991 | McClintock |
| 5,089,320 A | 2/1992 | Straus et al. |
| 5,125,211 A | 6/1992 | O'Brien et al. |
| 5,154,293 A | 10/1992 | Gould |
| 5,161,687 A | 11/1992 | Kornell et al. |
| 5,331,791 A | 7/1994 | Fux et al. |
| 5,366,087 A | 11/1994 | Bane |
| 5,387,453 A | 2/1995 | Cummisford |
| 5,399,403 A | 3/1995 | Instance |
| 5,401,533 A | 3/1995 | Borland |
| 5,511,883 A | 4/1996 | Clark et al. |
| 5,582,889 A | 12/1996 | Pedrini |
| 5,606,846 A | 3/1997 | Raby et al. |
| 5,725,311 A | 3/1998 | Ponsi et al. |
| D394,605 S | 5/1998 | Skiba et al. |
| 5,824,380 A | 10/1998 | Hagen |
| 5,855,434 A | 1/1999 | Hagen |
| 5,928,749 A | 7/1999 | Forman |
| 5,937,615 A | 8/1999 | Forman |
| 5,993,962 A | 11/1999 | Timm et al. |
| 6,022,051 A | 2/2000 | Casagrande |
| 6,048,100 A | 4/2000 | Thrall et al. |
| 6,056,141 A | 5/2000 | Navarini et al. |

*Primary Examiner*—Nasser Ahmad
(74) *Attorney, Agent, or Firm*—Jacox, Meckstroth & Jenkins

(57) ABSTRACT

This invention relates to a system and method for reclosing a package. A package reclosure is provided with a top layer having a perforation and a carrier substrate. A folded substrate or folded member is provided between the carrier substrate and top layer. The folded member is only secured to the top layer such that, when the perforation is torn, a portion of the folded member may be unfolded to reveal a repositionable adhesive which is used to retain an end of the package in a closed position.

43 Claims, 4 Drawing Sheets

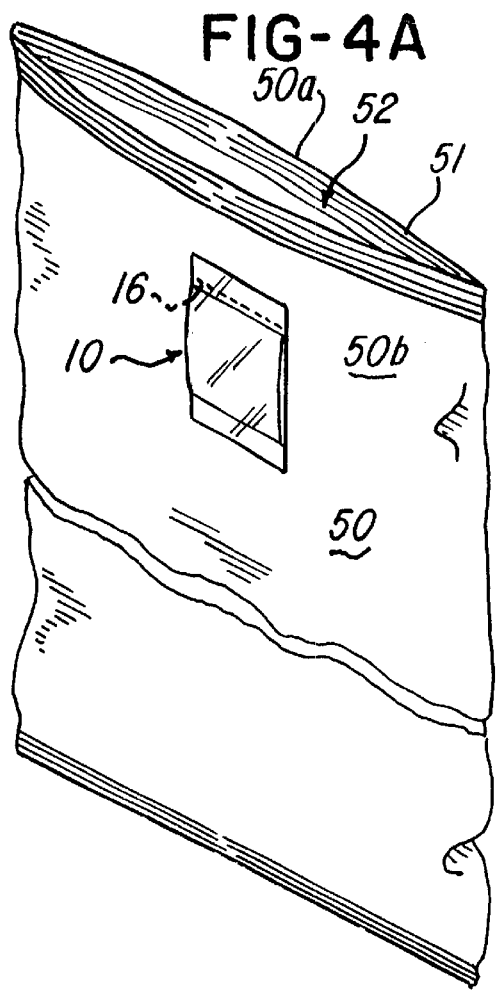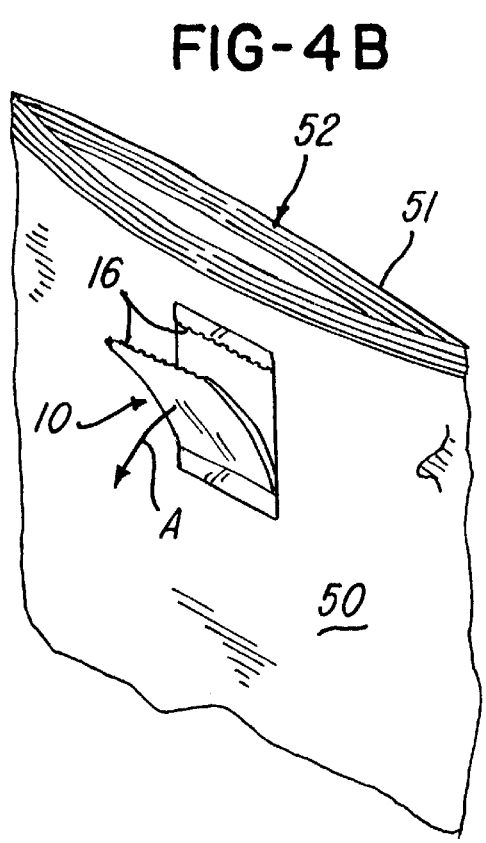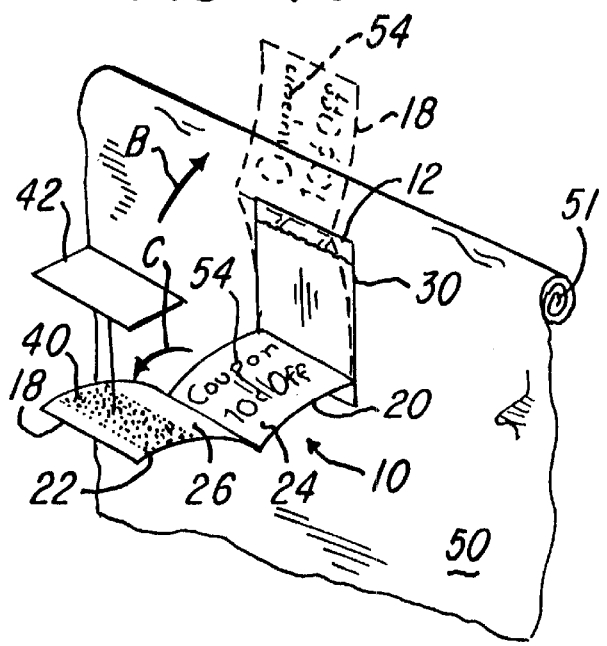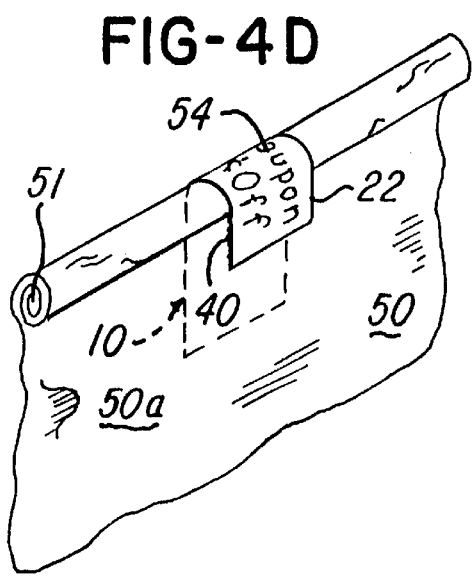

PACKAGE RECLOSURE SYSTEM AND METHOD

BACKGROUND OF THE INVENTION

1. Field of the Invention

This invention concerns a package reclosing system and method and, more particularly, a package reclosure having a folded member that may be unfolded after a perforation is torn and then situated over an opening of a package in order to seal the package and its contents.

2. Description of the Related Art

Many flexible packaging containers have been developed for various products, especially food products that are consumed over an extended period of time. Such products include fast food from traditional fast-food restaurants, as well as snack products, such as potato chips, pretzels, popcorn, corn chips, cereals and the like.

Typically, it is important that the package be tightly reclosed in order to keep the remaining contents fresh for several days or weeks after the first opening of the package. At the same time, it is desirable to keep the cost of the package low.

In some instances, the package is provided within a stiffer protective carton, while in other cases it is a heavier gauge material sufficiently strong to protect the contents without an outer carton. Of course, in traditional fast food restaurants, paper packaging is typically used.

Traditionally, a user would open the package, remove some or all of the contents and then reclose the package until the user desires to remove more of the contents at some point in the future.

Usually, folding the flexible package is generally not sufficient because the package does not have sufficient "memory" and, therefore, the package tends to open by itself when on a storage shelf or in a refrigerator, for example.

Many consumers have resorted to using Scotch-Tape® or a rubber band to hold the folded portion in place, but it is generally inconvenient because such devices are not always readily at hand.

In another consumer product, tape-tabs are used to fasten a disposable baby diaper around the infant. These tape-tabs are multi-part devices which are applied to the moveable end of the product, so that the moveable end may be secured in place on another portion of the diaper. In one sense, the baby diaper can be considered a "package" to contain the baby. Prior practice had been the use of safety pins or other non-associated closing devices. In the more recent past, the tape-tabs have been developed with a "reclosable" or "re-fastenable" feature that permits the diaper to be opened, the baby to be examined, and the diaper to be closed several times. In such a "package," the size of the contents (i.e., the baby) does not change from time to time as the "package" is opened or closed.

An early "tape-tab" closure for non-flexible packaging was disclosed in the Hamaguchi U.S. Pat. No. 3,616,114 that was granted in 1971. This closure was used to fasten the stiff ends of a card board carton in "butting" relationship, and was attached to the movable end of the container.

In 1971, Gellert U.S. Pat. No. 3,620,271 disclosed a similar fastening for disposable baby diapers, with a further improvement disclosed in his U.S. Pat. No. 3,646,937 issued in 1972.

The baby diaper market was rapidly expanding in the early 1970's, and Buell, in his U.S. Pat. No. 3,848,594, granted in 1974, showed how a "Y-form" configuration of this tape-tab would provide a further improvement in the closing of a baby diaper product.

The re-closing of flexible packages or bags was considered as early as 1967 and disclosed in Perino U.S. Pat. No. 3,301,466 and with subsequent improvement such as that shown in Jaeger U.S. Pat. No. 4,328,895.

One of the earliest package-sealing devices was shown in Newman U.S. Pat. No. 2,153,310 on Apr. 4, 1939; but like all the others, the closure device was either secured to the movable end of the package or was intended to be fully removed therefrom during the re-sealing and re-closing process and re-applied similar to the application of a strip of Scotch-Tape.

During the later part of the 1970's and early part of the 1980's, the re-sealability in multiple-closures of many of these products became a critical commercial matter, and one of the improvements is disclosed in the Cronkrite U.S. Pat. No. 4,299,223 which issued on Nov. 10, 1981. It particularly discloses how a tape-tab with a portion thereof having multiple strips of adhesive can be designed to provide a closure member which is strong in shear but weak in peel strength.

U.S. Pat. No. 5,824,380 discloses a package reclosure label having a base label which is secured by a pressure-sensitive adhesive to the package. A Z-folded top sheet has a first panel permanently adhered to the upper surface of the base sheet. A second panel is folded over the first panel with an edge extending past the first panel that is releasably adhered to the base sheet, and a third panel folded back over the second panel and extending beyond the second panel to a tab which is resealably adhered to the package. The label can be opened or extended by lifting the tab off the package and breaking the releasable bond between the second panel and the base sheet. Multiple labels can be stored and shipped on a reel of release liner by adhering them to the release liner by the pressure-sensitive adhesive on the back of the base sheet and by the resealable adhesive on the back of the tab.

U.S. Pat. No. 5,855,434, also issued to Hagen, discloses a package reclosure label has a paper base label which is secured by a pressure-sensitive adhesive to the package. A tear resistant synthetic top sheet has a first end permanently adhered to the base sheet and extends beyond the far end of the base sheet to a second end which is secured by a resealable adhesive directly to the package. A generally unadhered central portion of the top sheet is also releasably adhered to the base sheet. The package is reclosed by folding over its open flap and adhering the first end of the top sheet to the flap. The labels are provided for application to packages side-by-side in multitude on a continuous release liner, with the pressure sensitive adhesive of the base sheet and the resealable adhesive of the second end of the top sheet mounting the labels to the liner in production of the labels and prior to application of the labels to packages.

U.S. Pat. No. 4,902,141 discloses a plastic sealing tape for resealable flexible packaging comprising a tape having a first section provided with a permanent high-tack adhesive, and a second section being provided with a low-tack adhesive and being folded onto itself with the interposition of a layer of silicone, the second section having a free end being adhesive free.

What is needed is a system and method which has an improved design features over the methods and systems of the past and which are easy to manufacture.

SUMMARY OF THE INVENTION

It is, therefore, an object of the invention to provide an improved and simplified design for a package reclosure.

It is another object of the invention to provide a package reclosure having a single folded member which can be easily opened and used to seal a package.

Still another object of the invention is to provide a system and method having a folded member with a release liner thereon that can be easily removed in order to reclose the package.

Still another object of the invention is to provide a folded member having a release liner which is retained on the reclosure, or on the folded member, after the folded member is opened by the user.

In one aspect, this invention comprises a package reclosure comprising: a top layer having a first adhesive layer and a perforation; a folded substrate that is folded to define at least a first inward side and a second inward side and a first outward side and second outward side, the first and second outward sides being opposite the first and second inward sides, respectively; the first outward side being secured to the first adhesive layer; and a carrier substrate comprising a first side and a second side, the second side being secured to a first release liner with a second adhesive layer; the second inward side of the folded substrate comprising a third adhesive layer having a second release liner secured thereto; the folded substrate being folded such that the folded substrate can be unfolded when the perforation is broken to permit the release liner to be removed from the third adhesive layer to permit a user to reclose the package.

In another aspect, this invention comprises a package having an opening for receiving contents; a package reclosure positioned near the opening for reclosing the package; the package reclosure comprising: a top layer having a first adhesive layer and a perforation; a folded substrate that is folded to define at least a first inward side and a second inward side and a first outward side and second outward side, the first and second outward sides being opposite the first and second inward sides, respectively; the first outward side being secured to the first adhesive layer; and a carrier substrate comprising a first side and a second side, the second side being secured to a first release liner with a second adhesive layer; the second inward side of the folded substrate comprising a third adhesive layer having a second release liner secured thereto; the folded substrate being folded such that the folded substrate can be unfolded when the perforation is broken to permit the release liner to be removed from the third adhesive layer to permit a user to reclose the package.

In yet another aspect, this invention comprises a method for resealing a package comprising an opening through which contents may be placed in or removed from the package, the method comprising the steps of: situating a package reclosure having a perforation and positioned near the opening; and enabling a user to reclose the package by breaking the perforation, unfolding a folded substrate to expose an inward side of the folded substrate having a reclosure adhesive thereon, and repositioning the reclosure adhesive on the package to reseal the package.

These and other objects and advantages of the invention will be apparent from the following description, the accompanying drawings and the appended claims.

DESCRIPTION OF THE DRAWINGS

FIGS. 4A–4D illustrate a typical use of the reclosure shown in FIGS. 1–3 in order to reseal the package;

DETAILED DESCRIPTION OF THE INVENTION

Figure 1:
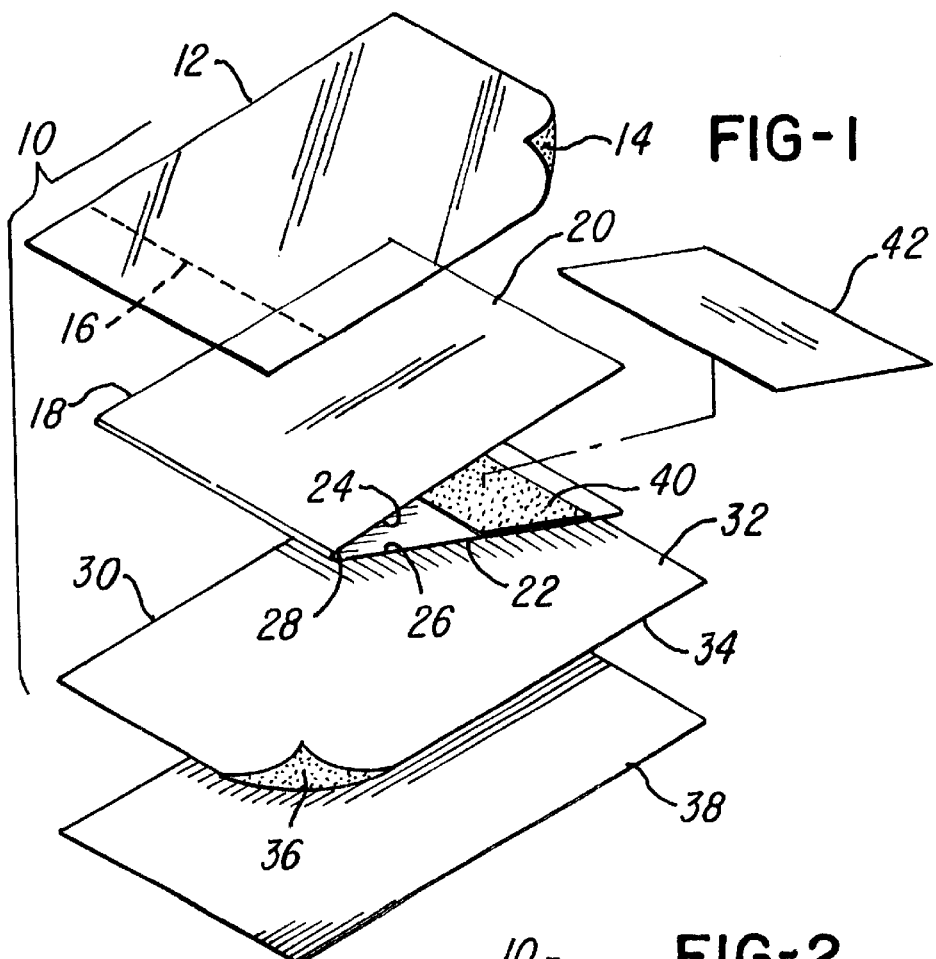
FIG. 1 is an exploded view showing various layers of a package reclosure in accordance with one embodiment of the invention.
Figure 2:
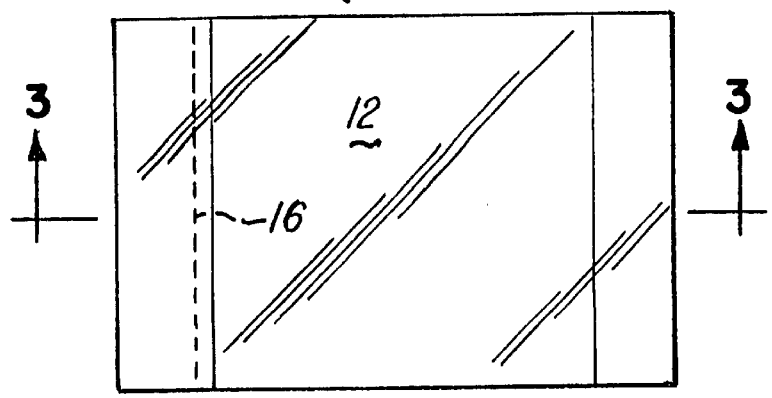
FIG. 2 is a plan view of the package reclosure shown in FIG. 1.
Figure 3:
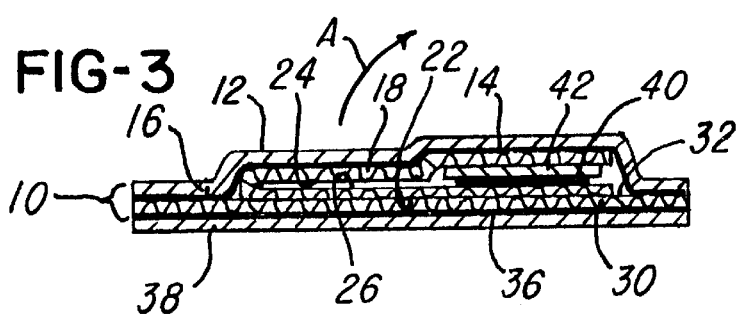
FIG. 3 is a view, taken along the line 3—3 in FIG. 2, illustrating an assembled view of the package reclosure showing the various layers of the reclosure.

Referring now to FIGS. 1–3, an embodiment of a package reclosure 10 is shown. The reclosure 10 comprises a top layer 12 having a first adhesive 14 adhered thereto. Notice that the top layer 12 comprises a perforation 16 (shown in FIG. 2) that may be broken in a manner described later herein.

Figure 8:
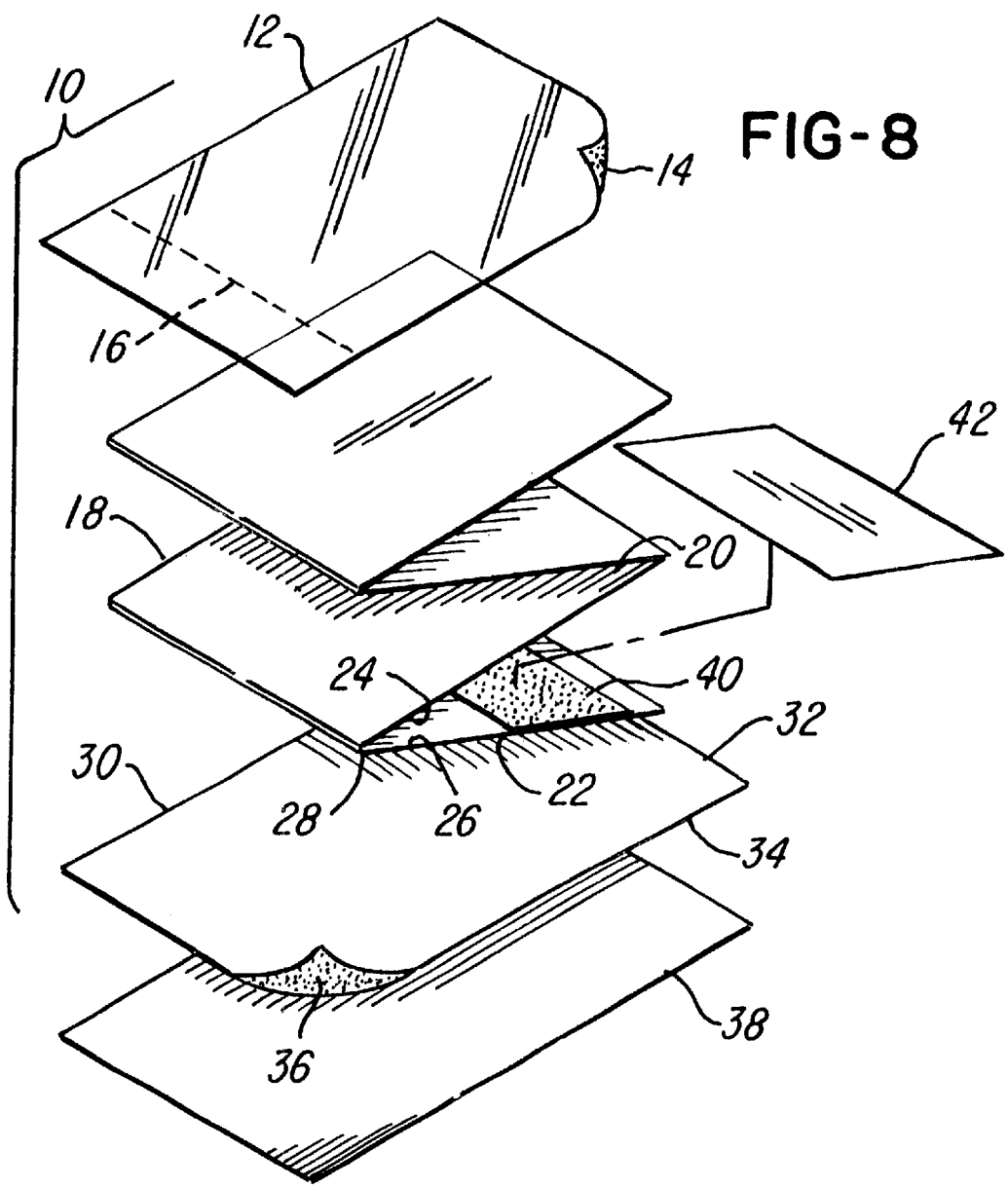
FIG. 8 is a view similar to the views shown in FIGS. 1 and 5, illustrating another embodiment of the invention wherein the folded substrate or member comprises a plurality of folds.

The reclosure 10 further comprises a folded substrate or member 18 having a first outer side or surface 20, a second outer side or surface 22, a first inward side or surface 24, and a second inward side or surface 26. The folded substrate 18 has a single fold 28 in the embodiment shown in FIG. 1, but it should be appreciated that the folded substrate 18 may comprise a plurality of folds, such as an accordian fold, as best illustrated in FIG. 8. It should be appreciated that providing multiple folds enables the folded member 18 to be provided in multiple lengths to accommodate different size packages 50 (FIG. 4A).

The reclosure 10 also comprises a carrier substrate 30 comprising a first side 32 and a second side 34. Notice, as best illustrated in FIGS. 1 and 3, that the second side 34 has a second adhesive layer 36 secured thereto. The second adhesive layer 36 receives a release liner 38. In the embodiment being described, the release liner 38 is at least a 40-pound silicone release liner which facilitates automatic dispensing of the reclosure 10 onto a desired package by, for example, "rolling" or separating the reclosure 10 from the release liner 38, as the release liner 38 is gathered, for example, on a take-up roll (not shown). In this regard, it should be appreciated that the release liner 38 may be a continuous web of material (not shown) having a plurality of reclosures 10 situated thereon to permit the release liner 38 to be gathered on the take-up roll as one of more reclosures 10 are situated on a package 50 (FIG. 4A). The release liner 38 may be a continuous sheet with multitudes of reclosures as situated thereon for dispensing on the package 50 (FIG. 4A).

FIG. 3 illustrates a completely assembled view of an embodiment of the invention illustrating the various components and layers in a fully assembled form. After the reclosure 10 is applied to the package 50 (FIG. 4A), the perforation 16 may be broken and the top layer 12 pivoted in the direction of Arrow A in FIGS. 3 and 4B. It should be appreciated that the first outward side 20 moves in the same direction of Arrow A because it is secured to the top layer 12, as described and shown.

Notice in FIG. 3 that the second outward side 22 of folded member 18 is not secured to the side 32 of carrier substrate 30, which permits the second inward side 26 of folded member 18 to pivot in the direction of Arrow A, as illustrated in FIG. 4B. This feature also permits the folded member to become unfolded (as illustrated in FIG. 4C).

As shown FIGS. 1 and 3, the second inward side 26 of folded substrate 18 comprises a third adhesive layer 40 for receiving a second release liner 42. After a user has rolled up the end of package 50 as desired, the perforation 16 can be torn to an open or unfolded position (illustrated in FIGS. 4B and 4C). The user can then remove the release liner 42 and secure the third adhesive layer 40 onto a side 50a, which is opposite side 50b, of package 50, as illustrated in FIG. 4C.

In the embodiment being described, the third adhesive layer 40 may be a repositionable adhesive, thereby permitting a user to reuse the reclosure 10 and also permitting the third adhesive layer 40 to be removed, for example, when the folded member 18 defines a game piece or coupon, for example, as described later herein.

It should be appreciated that the top layer 12 may comprise a pressure sensitive transparent layer of film, such as the 1 mil Polyester film available from Plastic Suppliers of Columbus, Ohio. The first adhesive layer 14 may be a permanent pressure sensitive adhesive layer such as the 2431 adhesive available from DYNA TECH of Graften, W. Va. The folded substrate 18 may comprise either paper or film, such as the 2 mil Polyester film available from Plastic Suppliers of Columbus, Ohio. The repositionable adhesive layer 40 may comprise the CA-501 adhesive from Ashland Chemical of Columbus, Ohio. Further, the carrier substrate 30 may comprise the 1 mil Polyester film or paper available from Plastic Suppliers of Columbus, Ohio. The second adhesive layer may also be a permanent pressure sensitive adhesive, such as the Hm-2707 adhesive available from H.B. Fuller Co. of St. Paul, Minn.

In the embodiment being described, these various components and their respective sources and illustrative dimensions may be summarized as follows:

| PART NUMBER | COMPONENT NAME | MANUFACTURER'S REFERENCE | MANUFACTURER | DIMENSIONS |
|---|---|---|---|---|
| 12 | Top Layer | clear polyester film | Plastic Suppliers | |
| 14 | First Adhesive Layer | 2431 | DYNA TECH | |
| 18 | Folded Substrate | polyester film | Plastic Suppliers | |
| 30 | Carrier Substrate | polyester film | Plastic Suppliers | |
| 34 | Second Adhesive | Hm 2707 | HB Fuller Co. | |
| 38 | First Release Liner | 50# A36 | Wausau Papers | |
| 40 | Third Adhesive Layer | CA-501 | Ashland Chemical | |
| 42 | Second Release Liner | 28# A48 | Wausau Papers | |

As best illustrated in FIGS. 4C and 4D, the folded member 18 may comprise printed information 54. It should be appreciated that the reclosure 10 may have the information 54 situated or printed on any or all of the first outward side 20, second outward side 22, first inward side 24 and second inward side 26. In the embodiment being described, information 54 may be in the form of game piece information, coupon information or any information desired to be displayed on the folded member 18 or to be provided to a user.

Figure 5:
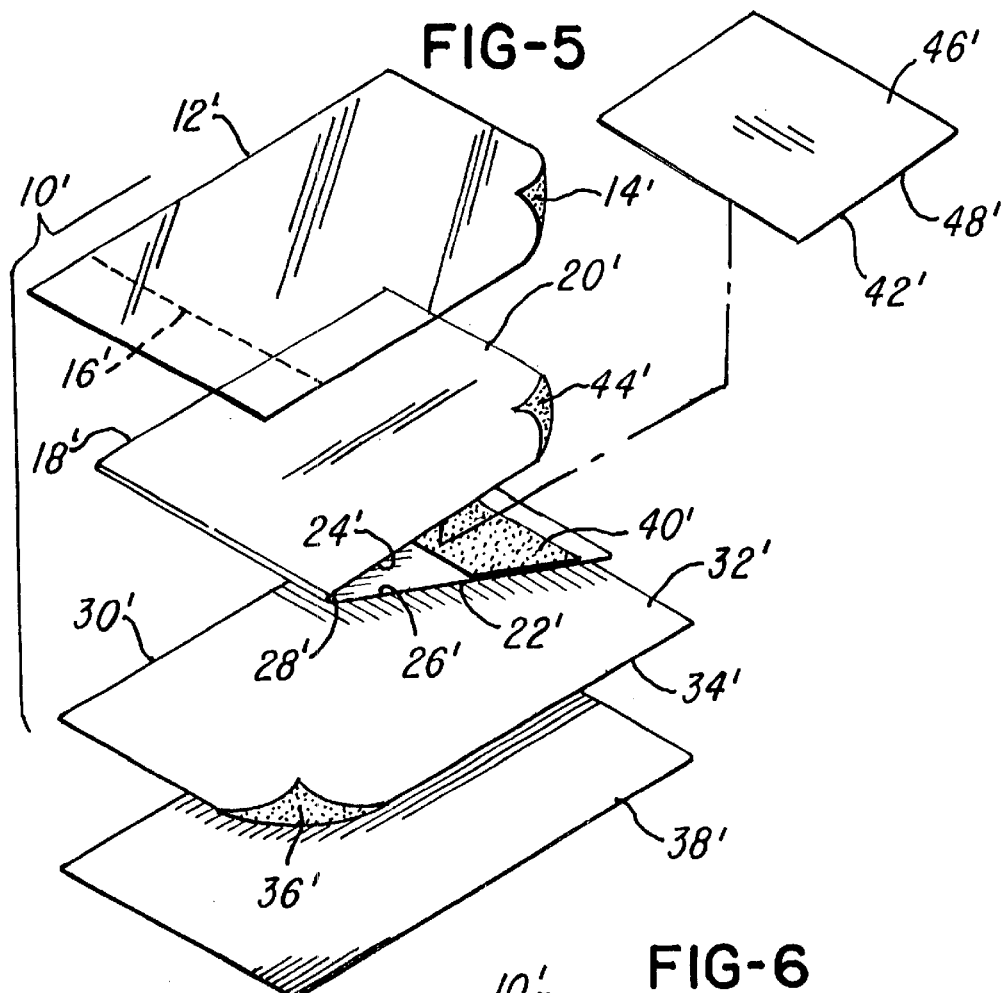
FIG. 5 is an exploded view showing the various layers of another embodiment of the invention, illustrating a fourth adhesive for securing a release liner onto a folded member during and after use of the package reclosure.
Figure 6:
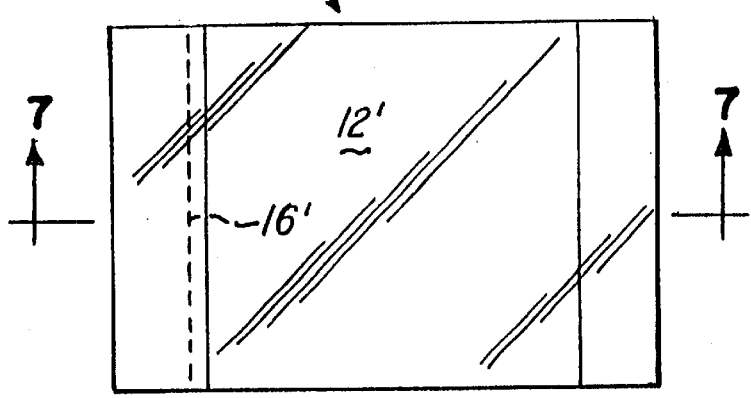
FIG. 6 is a plan view of the embodiment shown in FIG. 5.
Figure 7:
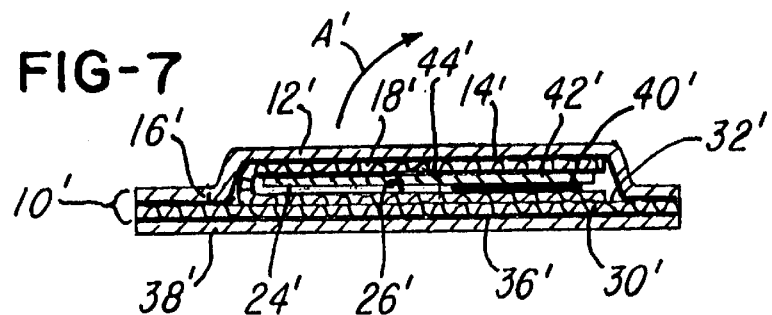
FIG. 7 is a view, taken along the line 7—7 in FIG. 6, illustrating an assembled view of the package reclosure in accordance with another embodiment of the invention.

FIGS. 5–7 illustrate another embodiment of the invention. Like parts are identified with the same part numbers, except that a prime mark ("'") has been added to the part numbers in the embodiment shown in FIGS. 5–7. A primary difference between the embodiment shown in FIGS. 1–4D versus FIGS. 5–7 is that the first inward side 24' of the folded member 18' comprises a fourth adhesive layer 44' in the embodiment shown in FIGS. 5–7. Thus, in the embodiment shown in FIGS. 5–7, a fourth adhesive layer 44' is adhered to the second inward side 24' of folded substrate 18' and receives a first liner side 46' of the second release liner 42'. Notice that, when the folded member 18' is in the folded position illustrated in FIG. 7, a second liner side 48' of the release liner 42' is simultaneously adhered to the third adhesive layer 40' on folded member 18' as shown.

It should be appreciated that the fourth adhesive layer 44' covers a first area on the first inward side 24' of folded member 18', and the third adhesive layer 40' covers a second area on the second inward side 26' of the folded member 18'. In this embodiment, the first area is about 1 square inches and the second area is about ½ square inch. This difference in relative sizes of the first and second areas causes the release liner 42' to remain secured to the first inward side 24' of folded member 18' after the folded member 18' is unfolded (as illustrated in FIG. 4C) during use. This facilitates, among other things, retaining the release liner 42' to the reclosure so that it does not become loose or separated therefrom, thereby reducing the chance it would be inadvertently lost or littered when the user removes the release liner 42' from the reclosure 10'.

It should be understood that the release liners 38, 38', 42, and 42' may comprise various weights of materials. For example, the release liner 42 and 42' may comprise a 28 pound silicone release liner, while the release liner 38 and 38' may comprise a heavier weight material, such as a 40 or 50 pound silicone coated release liner. It may be desirable for the release liners 38 and 38' to be somewhat heavier in order to automatically dispense the package reclosure 10 onto package 50.

It should also be appreciated that the first and second release liners 38 and 42 may be, for example, a 40-pound silicone coated release liner or, alternatively, the release liner 38 may be 40-pound or 50-pound silicone coated release liner and release liner 42 may be a 28-pound or 40-pound silicone coated release liner. It has been found that providing the second release liner 42 of a 28-pound silicone weight, for example, provides a thinner second release liner 42 which facilitates easy peeling and removal from the folded member 18.

A method for using and constructing the package reclosure 10 will now be described. In general, the reclosure 10 is assembled in three general layers. First, the carrier 34 is applied with the adhesive 36 and adhered to the release liner 38. The folded member 18 (in a folded state) is then situated on carrier substrate 32 and then the top layer 12, which has the adhesive 14 thereon, is laid over both the carrier substrate 30 and folded member 18. After the package reclosure 10 is assembled, as illustrated in FIGS. 3 and 7, the top layer 12 may be perforated to provide the perforation 16.

Turning now to FIGS. 4A–4D, the package 50 comprises an opening 52 for receiving contents (not shown) For ease of description, the first embodiment (FIGS. 1–3) will be used for illustration, with the understanding that such description substantially applies to the second embodiment as well. The reclosure 10 is positioned with the carrier substrate 30 secured to the package 50 with the second adhesive layer 36 after the first release liner 38 has been removed.

When a user desires to close or reclose the package 50, the perforation 16 (FIGS. 4A–4B) is torn, and the reclosure 10 pivoted in the direction of Arrow A (FIG. 4B). The end 51 of package 50 is folded or rolled up, and the second inward side and second outward 26 and 22, respectively, are then pivoted in the direction of Arrow C (FIG. 4C). The user may then peel off or remove the second release liner 42 for the embodiment shown in FIGS. 1–3 (or the release liner 42' will remain secured to the first inward side 24' of folded substrate 18' for the embodiments shown in FIGS. 5–7). The user then secures the third adhesive layer 40 to the side 50a of package 50, thereby reclosing the package.

As mentioned earlier herein, the third adhesive layer 40 may be repositionable so that the folded member 18 may be removed from the package 50 when it is desired to open the package 50 and then reposition the reclosure 10 on the package 50 when it is desired to close the opening 52 when desired. The repositionable adhesive also permits it to be removed from the folded member 18 if desired, for example, when the folded member 18 has printed information (e.g., a coupon) which the user wishes to retain.

Advantageously, this invention provides a system and method for resealing the opening 52 of the package 50 by situating the reclosure 10 near the opening 52, breaking the perforation 16 (FIGS. 1–3), unfolding a folded substrate to expose the first inward side of the folded substrate 18 so that the adhesive 40 can secure the folded member 50 to the package 50 to re-seal the package.

This system and method also allows mass production of reclosure 10 because of the ease of manufacture of the reclosures side by side on a continuous release liner web (not shown). The simple construction and layers of applicant's invention provide means for assembling and applying the package reclosure 10 using conventional or standard label application equipment which is commercially available.

Moreover, this invention provides means for providing printed information on at least one of the sides 20, 22, 24 or 26 of folded member 18 as desired.

While the reclosure 10, method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A package reclosure comprising:
   a top layer having a first adhesive layer and a perforation;
   a folded substrate that is folded to define at least a first inward side and a second inward side and a first outward side and second outward side, said first and second outward sides being opposite said first and second inward sides, respectively; said first outward side being secured to said first adhesive layer; and
   a carrier substrate comprising a first side and a second side, said second side being secured to a first release liner with a second adhesive layer;
   said second inward side of said folded substrate comprising a third adhesive layer having a second release liner secured thereto;
   said folded substrate being folded such that said folded substrate can be unfolded when said perforation is broken to permit said release liner to be removed from said third adhesive layer to permit a user to reclose said package.

2. The package reclosure as recited in claim 1 wherein said third adhesive layer is a repositionable adhesive.

3. The package reclosure as recited in claim 1 wherein said second release liner comprises a first inward side adhered to said second inward side of said folded substrate and a second liner side secured to said third adhesive layer.

4. The package reclosure as recited in claim 3 wherein said first liner side is adhered to said second inward side of said folded substrate using a fourth adhesive layer covering a substantial portion of said first inward side.

5. The package reclosure as recited in claim 4 wherein said fourth adhesive layer covers a first area on said first inward side and said third adhesive layer covers a second area on said second inward side, said first area being greater than said second area.

6. The package reclosure as recited in claim 1 wherein said folded substrate comprises a fold line situated adjacent said perforation.

7. The package reclosure as recited in claim 1 wherein said second release liner is at least a 40-pound weight.

8. The package reclosure as recited in claim 1 wherein said first release liner is at least a 40-pound weight.

9. The package reclosure as recited in claim 8 wherein said second release liner is at least a 40-pound weight.

10. The package reclosure as recited in claim 1 wherein said second release liner is at least a 28-pound weight.

11. The package reclosure as recited in claim 8 wherein said second release liner is at least a 28-pound weight.

12. The package reclosure as recited in claim 1 wherein said top layer is either paper or film.

13. The package reclosure as recited in claim 1 wherein said folded substrate is either paper or film.

14. The package reclosure as recited in claim 1 wherein said folded substrate comprises information.

15. The package reclosure as recited in claim 14 wherein said information provides a coupon.

16. The package reclosure as recited in claim 1 wherein said folded substrate comprises a plurality of folds.

17. The package reclosure as recited in claim 4 wherein said folded substrate comprises a single fold.

18. The package reclosure as recited in claim 4 wherein said third adhesive layer is a repositionable adhesive.

19. A package comprising:
   a package having an opening for receiving contents;
   a package reclosure positioned near said opening for reclosing said package;
   said package reclosure comprising:
      a top layer having a first adhesive layer and a perforation;
      a folded substrate that is folded to define at least a first inward side and a second inward side and a first outward side and second outward side, said first and second outward sides being opposite said first and second inward sides, respectively; said first outward side being secured to said first adhesive layer; and
      a carrier substrate comprising a first side and a second side, said second side being secured to a first release liner with a second adhesive layer;
   said second inward side of said folded substrate comprising a third adhesive layer having a second release liner secured thereto;
   said folded substrate being folded such that said folded substrate can be unfolded when said perforation is broken to permit said release liner to be removed from said third adhesive layer to permit a user to reclose said package.

20. The package as recited in claim 19 wherein said third adhesive layer is a repositionable adhesive.

21. The package as recited in claim 19 wherein said second release liner comprises a first liner side adhered to said first inward side of said folded substrate and a second liner side secured to said third adhesive layer.

22. The package as recited in claim 21 wherein said first liner side is adhered to said second inward side of said folded substrate using a fourth adhesive layer covering a substantial portion of said first inward side.

23. The package as recited in claim 22 wherein said fourth adhesive layer covers a first area on said first inward side and said third adhesive layer covers a second area on said second inward side, said first area being greater than said second area.

24. The package as recited in claim 19 wherein said folded substrate comprises a fold line situated adjacent said perforation.

25. The package as recited in claim 19 wherein said second release liner is at least a 40-pound weight.

26. The package as recited in claim 19 wherein said first release liner is at least a 40-pound weight.

27. The package as recited in claim 26 wherein said second release liner is at least a 40-pound weight.

28. The package as recited in claim 19 wherein said second release liner is at least a 28-pound weight.

29. The package as recited in claim 26 wherein said second release liner is at least a 28-pound weight.

30. The package as recited in claim 19 wherein said top layer is either paper or film.

31. The package as recited in claim 19 wherein said folded substrate is either paper or film.

32. The package s recited in claim 19 wherein said folded substrate comprises information.

33. The package as recited in claim 32 wherein said information defines a coupon.

34. The package as recited in claim 19 wherein said folded substrate comprises a plurality of folds.

35. The package as recited in claim 22 wherein said folded substrate comprises a single fold.

36. The package as recited in claim 22 wherein said third adhesive layer is a repositionable adhesive.

37. A method for resealing a package comprising an opening through which contents may be placed in or removed from said package, said method comprising the steps of:

situating a package reclosure having a perforation and positioned near said opening; and enabling a user to reclose said package by breaking the perforation, unfolding a folded substrate to expose an inward side of said folded substrate having a reclosure adhesive thereon, and repositioning said reclosure adhesive on said package to reseal said package.

38. The method as recited in claim 37 wherein said method further comprises the step of:

providing said package reclosure comprising:

a top layer having a first adhesive layer and a perforation;

a folded substrate that is folded to define at least a first inward side and a second inward side and a first outward side and a second outward side, said first and second outward sides being opposite said first and second inward sides, respectively, said first outward side being secured to said first adhesive layer; and a carrier substrate comprising a first side and a second side, said second side being secured to a first release liner with a second adhesive layer;

said second inward side of said folded substrate comprising a third adhesive layer having a second release liner secured thereto;

said folded substrate being folded such that said folded substrate can be unfolded when said perforation is broken to permit said release liner to be removed from said third adhesive layer to permit a user to reclose said package.

39. The method as recited in claim 37 wherein said method further comprises the step of:

providing a film as said top layer.

40. The method as recited in claim 37 wherein said second release liner comprises a first liner side adhered to said first inward side of said folded substrate and a second liner side secured to said third adhesive layer.

41. The method as recited in claim 40 wherein said first liner side is adhered to said second inward side of said folded substrate using a fourth adhesive layer covering a substantial portion of said second inward side.

42. The method as recited in claim 41 wherein said fourth adhesive layer covers a first area on said first inward side and said third adhesive layer covers a second area on said second inward side, said first area being greater than said second area.

43. The method as recited in claim 41 wherein said third adhesive layer is a repositionable adhesive.

* * * * *